United States Patent Office 3,088,931
Patented May 7, 1963

3,088,931
NITROGEN CONTAINING POLAR MONOMER GRAFTED ON AN ISOBUTYLENE-MONOVINYL-ETHER COPOLYMER BACKBONE
Clyde S. Scanley, Stamford, Frederick H. Siegele, Cos Cob, and Richard L. Webb, Darien, Conn., assignors to American Cyanamid Company, New York, N.Y., a corporation of Maine
No Drawing. Filed Oct. 27, 1958, Ser. No. 769,595
2 Claims. (Cl. 260—45.5)

This invention relates to improved polymer useable as oil additives for the improvement of viscosity index and for other purposes where detergency is of importance.

There are a number of problems in connection with petroleum fuels and lubricants in which the use of additives are important to impart improved properties. One of the important classes of petroleum products are lubricating oils. Lubricating oils present a viscosity problem because of the very wide range of temperatures over which they operate. Thus, for example, on a cold day when an internal combustion engine is first started, the temperature of the oil may be far below freezing. As the motor warms up, the temperature of the oil increases, for example, to the boiling point of water or even in some cases higher and on a very hot day or in the case of lubricants which are subjected to special heat problems such as the lubricants in certain torque converters, the oil temperature may go still higher. It is important that the viscosity of the lubricant be not too high so that it will flow at very low temperatures and yet not thin out sufficiently at high temperatures so that inadequate lubrication results. Ordinary petroleum hydrocarbon lubricants, even when dewaxed, show too high a variation in viscosity with temperature or, as is normally stated in the art, have a poor viscosity index.

A number of additives have been used to improve viscosity index. One type comprises polymers of either isobutylene or vinyl ether which are prepared by conventional acid catalyzed processes. These polymers, when of appropriate molecular weight, are in fact good viscosity index improvers. However, there is another property which is important in lubricants, especially heavy duty lubricants, and that is detergency or the property of maintaining decomposition products of the lubricating oil, such as tars, particles of carbon and the like, in a fine dispersion so that they do not deposit in the parts of an internal combustion engine and do not cause serious plugging of oil filters, particularly those of the fine pore sintered metal type. The polyisobutylenes and polyvinyl ethers have little or no detergent powers and this has made them less satisfactory as lubricant additives.

Attempts have been made to produce polymers which would contain a large number of polar groups, such as polymers of methacrylic esters, maleic esters and the like. These polymers do have detergent properties but their cost, which is much higher than polyisobutylene or polyvinyl ether, is a serious disadvantage. An attempt was made to produce copolymers from monomers, such as vinyl ether and random polar monomers. Such copolymers are satisfactory viscosity index improvers but have entirely insufficient detergent properties to be practically useful.

The present invention produces polymers of predominantly cheap, acid catalyzed monomers such as isobutylene, vinyl ether and the like. However, instead of copolymerizing with polar monomers, the acid catalyzed polymer backbone is treated to form so-called oxidized sites on which polar monomersh can be grafted by free radical polymerization and astonishingly small amounts of polar monomers, when grafted on, impart excellent detergency. As little as 0.05% impart useful detergence properties and larger amounts up to 15% may be used. Still larger amounts do not give any advantageous results and merely increase the cost of the resulting product without benefit. For best practical operation, the rate of polar monomers grafted on should be from 0.1% to 10%, this constituting the preferred range and being included as a more specific aspect of the present invention.

In order to produce oxidized sites in the acid catalyzed polymer backbone, there must be present active hydrogens. This may be a hydrogen attached to a carbon atom to which oxygen is attached together with other organic radicals, as in the case of vinyl ether, or they may be activated in other ways, that is to say the hydrogen may be a tertiary hydrogen, the other bonds to its carbon atom being organic radicals. A double bond also will produce an activated hydrogen as will, in some cases, the presence of a halogen atom. Typical tertiary hydrogen compounds are to be found in polystyrene or styrene copolymers. Double bond activation is less practical as the presence of a large number of double bonds, as in polybutadiene, polyisoprene and the like results in a compound which is not as stable under high temperatures. However, where only a few sites are needed, the polymer backbone may contain a corresponding number of double bonds to produce activated hydrogens. Hydrogens activated by the presence of halogen on the same carbon atom are also useful.

It will be noted that polyisobutylene does not contain active hydrogens except for the single double bond at the end of the molecule. In other words, a homopolymer of isobutylene cannot be used according to the present invention to produce compounds with grafted polar monomers. On the other hand, isobutylene is cheap and it confers satisfactory viscosity index improvement. Therefore, when isobutylene backbone polymers are to be used in the present invention, they must be copolymerized with a sufficient number of monomers, such as vinyl ether, styrene and the like so as to provide an adequate number of activated hydrogens in the molecule to produce the required sites for grafting on of polar monomers by free radical polymerization. In general, when it is desired to produce a polymer with a large proportion of isobutylene, the comonomers having activated hydrogens may vary from 0.02% up to 20%. Of course, higher amounts may be present but inasmuch as these monomers are somewhat more expensive than isobutylene and no advantage is obtained, the 20% constitutes an economic limit for cheapest products.

It is an advantage of the present invention that the initial backbone of the polymer may be produced by conventional polymerization methods using conventional catalysts. Up to this point, the polymers are not new and no new techniques need to be learned in producing them. It is likewise an advantage that the preparation of the oxidized or peroxide sites for graft polymerization may be effected by various means which are in themselves known. Thus, for example, ionizing radiation, for example X-rays, high energy electrons and the like may be used. Chemical preparation, for example by treatment with ozone, is another useful method. The grafting of the polar monomer is effected simply and easily by heating, if desired, in a suitable solvent.

Various polar monomers can be used, such as nitrogen bases, both tertiary and quaternary, having suitable olefinic double bonds. Typical compounds are as follows:

Diallyl dialkyl ammonium halides
Dialkylaminoalkyl acrylates and methacrylates
Dialkylaminoalkyl vinyl ethers and quaternary vinyl ethers
Alkyl vinyl sulfoxides and sulfones
Dialkylaminostyrenes and methylstyrenes
N-substituted acrylamides
N-alkylacrylamides
N,N-dialkyl-o-allylisourea
Bis-(2-dialkylaminoalkyl) fumarates
N-vinyl carbazole
Vinyl pyridines
2-(4-morpholinyl) ethyl acrylate
2-morpholinylethyl vinyl ether
N-vinylimidazole
Piperazinylethyl vinyl ether
1-(β-methacrylyloxyethyl) piperidine
Diamino-alloxy-5-triazine
Vinyl pyrrolidone Another form of polar monomer are acidic monomers, such as acrylic acid, methacrylic acid, vinyl sulfonic acid and the like. The acids, of course may be present either as free acids or salts.

It is not known why so small a quantity of polar monomers, when grafted on according to the present invention, confer such a relatively enormous increase in detergent power. It is not desired, therefore, to limit the invention to any particular theory and especially it is not desired to limit it to any specific proportion of the total number of oxidized sites on which free radical polymerization takes place. In other words, a given number of polar monomers may be grafted singly each to one site or a number of them may be grafted in the form of a chain on a fewer number of sites. Without desiring to limit the invention, it is believed that a possible explanation of the greatly increased detergent power may be that the grafted polar monomers are sticking out as chains from a predominantly straight chain polymer backbone and so have more active groups than if they were part of the backbone itself. It is also thought likely, though by no means certain, that on at least some sites, more than one polar monomer may be involved in the graft.

It has been pointed out above that the formation of oxidized sites for free radical polymerization may be effected by ionizing radiation. In general, this procedure should be used with solvents as it is necessary to the invention that the polymer be in the form of a liquid. The radiation of solid polymers and subsequent grafting does not produce useable products under the present invention. While it is desirable to use a solvent, the particular solvent to be used is not critical. Typical solvents are the following: acetone, bromoform, carbon tetrachloride, chlorobenzene, chloroform, cyclohexane, cyclohexyl chloride, o-dichlorobenzene, 1,2-dichloroethane, diethyl ether, dioxane, ethanol, ethyl acetate, ethyl bromide, heptane, hexane, mixed long chain aliphatic hydrocarbons, methanol, methyl acetate, methylene dichloride, octane and propanol. It is also possible to use water, although this is not a solvent, provided the acid catalyzed backbone polymer in the form of a liquid or a solution is emulsified or otherwise finely dispersed therein.

For the most part, the solvents may be used in the subsequent step which has the advantage of utilizing the same reaction medium for two steps and so saving costs of isolation. However, some solvents, such as bromoform and carbon tetrachloride which are useable in the irradiation step, are unsatisfactory in the grafting step as they interfere with satisfactory growth of the branches.

While it is an advantage that ordinary radiation techniques may be employed when this method is used to produce oxidized sites, there are some practical limits. Thus, the efficiency of the radiation from X-rays from electron beams of too low voltage is insufficient to be useful. The practical limit may be considered X-rays from beams having from fifty thousand to ten million electron volts, preferably from half a million to ten million. Of course, higher energy beams may be used to produce harder X-rays but there is no advantage and the cost of equipment rises very rapidly. The dose varies between 0.1 and 10 megarads, preferably from 0.75 to 2.5 megarads. The lower limit is set by that at which a minimum amount of grafting is made possible and is in general lower than preferred most practical operations, although such small doses can be used. The upper limit is determined by the effect on the molecular weight. Substantial diminishing of molecular weight occurs at a dosage of 10 megarads and rises rapidly with increasing doses. This may therefore be considered as the practical top limit for dosage.

The invention has been described particularly in connection with polymers to be used as additives for lubricating oil in order to improve both the viscosity index and detergency. Another use in which the detergent effect is the primary function lies in jet fuels and similar fuels which have to pass through a fine filter, such as a sintered bronze or steel filter. It is essential to prevent larger particles from entering a jet engine. However, difficulty is sometimes encountered due to plugging of the fine pores of the filter with carbon tars or other decomposition products of the fuel for the latter is usually used as a coolant on its way to the combustion chamber and so is subjected to fairly high temperatures which can result in some decomposition. A small amount of the index improving polymers of the present invention will provide for a satisfactory detergency which prevents or minimizes difficulties resulting from filter clogging. Other uses in which the detergency is the primary factor include dispersions such as printing inks.

When used to impart improved detergency or dispersion to jet fuels and other systems such as printing inks, the amount of the copolymer used will often be much less than in a lubricating oil and it may be used in amounts such that there is no marked change in viscosity index. The polymer, however, still has the same properties of improving the viscosity index of oils when used in suitable amounts.

Reference has been made above to the desirability, in some cases, of using a solvent in a radiation step which can later be used for the free radical grafting. It is not necessary that the reaction proceed in completely separate steps, although for some purposes this is desirable and permits maximum control of the reaction. It is also possible to operate in a one step process which saves several steps and is also included in the invention. It should therefore be understood that while in fact there are two steps in the reaction mechanism, these steps may be going on simultaneously in a single operative step.

Reference has been made to the desirability of producing a liquid polymer. For many purposes, this is very satisfactory. However, it should be understood that since the polymer is used in solution in hydrocarbon lubricating oils or fuels, it is not necessary that the pure polymer be itself liquid. It is sufficient that it is oil soluble and forms a suitable solution in the hydrocarbon in which it is finally used.

The invention will be described in greater detail in conjunction with the specific examples in which the parts are by weight unless otherwise specified. The examples are typical of procedures which result in forming oxidized sites and do not in this respect differ greatly from what is known of the means for accomplishing this result, such as ionizing radiation, ozone and the like. Modifications of the procedure as is known may be used and it is an advantage that the procedure is not critical so long as the rather broad limits set out above are observed.

EXAMPLE 1

An oxygen saturated solution containing 20 parts of an oil soluble polyvinylether copolymer in 80 parts of chlorobenzene is irradiated with X-rays from a 250,000 volt electron beam. The irradiation is continued until the total dosage reaches 1 megarad.

The reaction medium is deoxygenated, introduced into a polymerization reactor and maintained under an atmosphere of carbon dioxide. One part of diethylaminoethyl acrylate dissolved in chlorobenzene is added and the solution heated rapidly to the reflux temperature, 132° C. After one half hour, an additional part of diethylaminoethyl acrylate was gradually added over a half hour period. The solution is then maintained at the reflux temperature until grafting is complete. The reaction is then cooled and the product precipitated with methanol and dried. It is an oil soluble, tacky, resinous, brown colored polymer. Analysis shows that the grafted polymer contained 0.63% diethylaminoethyl acrylate.

EXAMPLE 2

The procedure of Example 1 is repeated substituting for the diethylaminoethyl acrylate an equal amount of dimethylaminopropyl acrylamide. The original polyvinylether which is colorless is transformed into a resinous, brown colored, oil soluble polymer which on analysis shows 0.49% grafted dimethylaminopropyl acrylamide.

EXAMPLE 3

The procedure of Example 1 is repeated replacing the diethylaminoethyl acrylate with acrylamidostearic acid dissolved in chlorobenzene. The time for the various steps is reduced to approximately one half. The product obtained analyzes 2.3% acrylamidostearic acid.

EXAMPLE 4

The procedure of Example 1 is repeated replacing the diethylaminoethyl acrylate with 2-methyl-5-vinyl pyridine but twice as much of the methyl vinyl pyridine is used and the reaction temperature is maintained at about 90° C. instead of 132° C. An oil soluble, tacky, resinous, brown colored polymer is obtained which analyzes 0.16% 2-methyl-5-vinyl pyridine.

EXAMPLE 5

The procedure of Example 4 is repeated replacing the 2-methyl-5-vinyl pyridine with an equal amount of acrylonitrile. The polymer obtained is resinous and honey-colored and analyzes 0.4% acrylonitrile.

EXAMPLE 6

The procedure of Example 1 is repeated replacing the diethylaminoethyl acrylate with an equal amount of N-vinyl pyrrolidone. The product obtained is resinous and brown colored and analyzed 0.56% N-vinyl pyrrolidone.

EXAMPLE 7

An oxygen free solution containing 20 parts of an oil soluble polyvinyl ether and 2 parts of 2-methyl-5-vinyl pyridine in 80 parts of chlorobenzene is irradiated for 2 hours at room temperature with X-rays as described in Example 1. The total dosage is slightly over 1 megarad. The grafted polymer is reprecipitated with methanol several times from pentane and dried. The product showed good detergency by the detergent test which follows the examples.

EXAMPLE 8

The procedure of Example 7 is repeated replacing the 2-methyl-5-vinyl pyridine with an equal amount of N-vinyl pyrrolidone. The product obtained is oil soluble and shows good detergent powers.

EXAMPLE 9

Ozone is bubbled through a solution containing 20 parts of an oil soluble polyvinylether copolymer in 80 parts of pentane at 0° C. for 2 hours. The pentane is then evaporated off under a vacuum and replaced with 80 parts of chlorobenzene and 2 parts of 2-methyl-5-vinyl pyridine is added. The solution is deoxygenated with nitrogen and heated rapidly, 132° C. The heating is continued for an hour and a half followed by cooling, precipitation with methanol and drying. Grafted polymer analyzed 0.8% 2-methyl-5-vinyl pyridine and had detergent properties indistinguishable from a similar grafted polymer in which the sites were prepared by radiation as described in Example 1.

EXAMPLE 10

A solution of 75% pentane, 20% isobutylene and 5% vinylisobutyl ether together with 0.5% $AlCl_3$ is permitted to react at minus 40° C. until copolymerization to an oil soluble copolymer results. The copolymer is then purified by precipitation with methanol and treated as described in Example 1 except that instead of using diethylaminoethyl acrylate, a corresponding amount of diethylaminoethyl methacrylate is used. The polymer is recovered and analyzes 0.6% diethylaminoethyl methacrylate.

EXAMPLE 11

The process of Example 10 is repeated replacing the vinylisobutyl ether with an equal weight of styrene. The product analyzes 0.25% diethylaminoethyl methacrylate.

EXAMPLE 12

The following dispersancy test to measure quantitatively detergent powers of products of the preceding examples is carried out as follows. 0.2 part of a 20% carbon black suspension in Fractol A (refined white mineral oil) is suspended in 50 parts of kerosene. The carbon black is thoroughly dispersed by stirring and then blending in a Waring Blendor. After blending for one minute, the suspension is centrifuged for 5 minutes at 3000 r.p.m. The turbidity after centrifuging is obtained by measuring transmission of the suspension with a filter photometer. A series of test dispersions were made with small additions, from 0.1 to 5.0 parts of a 1% solution of the polymers. The test was made to determine what amount by percent of real polymer will give a 10% transmission reading. This is a measure of the activity of the polymer as a detergent. The more active it is, the smaller the quantity required to produce a 10% transmission reading. The results are shown in the following table:

Table I

| Identity | Nitrogen Containing Monomer | Percent Nitrogen in Polymer | Wt. Percent of Polymer giving a 10% T. reading in the Dispersancy Test | Viscosity Index |
|---|---|---|---|---|
| 70/30 isobutyl-ethyl hexyl vinyl-ether copolymer. | | | Not active | 137 |
| Do | Dimethylaminopropyl acrylamide. | 0.087 | 0.008 | 134 |
| Do | Diethylaminoethyl acrylate. | 0.051 | 0.008 | 134 |
| Do | N-vinyl pyrrolidone. | 0.070 | .070 | 133 |
| Do | Acrylamidostearic acid. | 0.091 | 0.035 | 130 |
| Do | Acrylonitrile | 0.11 | 0.038 | 128 |
| Do | 2-methyl-5-vinyl pyridine. | 0.16 | 0.008 | |

EXAMPLE 13

The irradiation and grafting of the polyvinylether copolymer was carried out as described in Example 4. In this case the monomer grafted was acrylic acid. The grafted polymer contains 0.25% acrylic acid.

EXAMPLE 14

The ozonolysis and grafting of the polyvinylether was carried out as described in Example 9. The grafted monomer was acrylic acid. This grafter polymer contains .52% acrylic acid.

EXAMPLE 15

A polyvinylether grafted with 1.0% diethyl-aminoethyl methacrylate was added at a concentration of 0.03% to a jet engine fuel. The additive containing jet fuel was heated and recirculated through a filter under pressure. Fuel stability is determined by operating until a pressure drop of 25 inches of mercury is obtained across the filter or until 300 minutes have elapsed. A fuel containing no additive failed after 130 minutes. The fuel containing the additive described above exhibited only an 0.2 inch pressure drop during the 300 minute duration of the test.

We claim:

1. A graft polymer having viscosity index improving properties and detergent properties consisting of a copolymer of isobutylene with from 0.2% to 20% of a monovinyl ether monomer having an active hydrogen capable of transformation into an oxidized site said percentage of the monovinyl monomer being based on isobutylene, said polymer having grafted thereon from 0.05% to 15% of an unsaturated, polar, nitrogen-containing monomer based on the weight of the said polymer and having a detergent power such that less than 0.15% by weight of the polymer in an 0.08% by weight carbon black suspension in kerosene which is then centrifuged imparts 10% transmission of visible light.

2. A copolymer according to claim 1 in which the range of polar monomer is from 0.1% to 10%.

References Cited in the file of this patent

UNITED STATES PATENTS

| 2,727,862 | Giammaria | Dec. 20, 1955 |
| 2,737,496 | Catlin | Mar. 6, 1956 |
| 2,837,496 | Vandenberg | June 3, 1958 |
| 2,838,456 | Banes et al. | June 10, 1958 |
| 2,882,290 | Coover et al. | Apr. 14, 1959 |
| 2,893,868 | Barney | July 7, 1959 |

FOREIGN PATENTS

| 1,161,824 | France | Mar. 31, 1958 |